Figure 1:
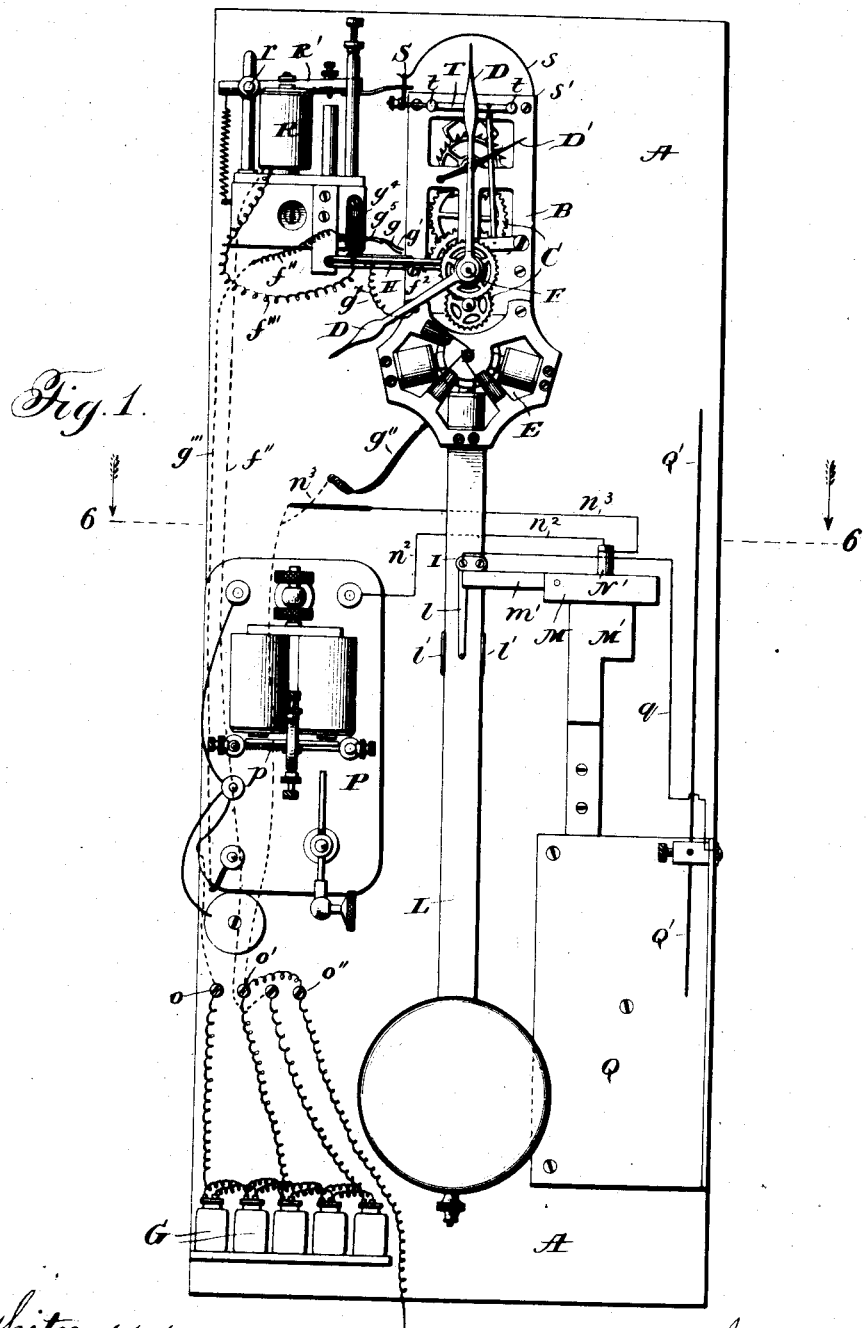

No. 867,898.  PATENTED OCT. 8, 1907.
A. H. STEWART.
SPACE ELECTROMECHANICAL SYNCHRONIZING MEANS.
APPLICATION FILED JUNE 18, 1903.

8 SHEETS—SHEET 1.

Witnesses:
Jas. E. Hutchinson
Thos. R. Heath

Inventor:
Austin H. Stewart
By Bacon & Milans
Atty's

No. 867,898. PATENTED OCT. 8, 1907.
A. H. STEWART.
SPACE ELECTROMECHANICAL SYNCHRONIZING MEANS.
APPLICATION FILED JUNE 18, 1903.

8 SHEETS—SHEET 2.

No. 867,898. PATENTED OCT. 8, 1907.
A. H. STEWART.
SPACE ELECTROMECHANICAL SYNCHRONIZING MEANS.
APPLICATION FILED JUNE 18, 1903.

8 SHEETS—SHEET 4.

Witnesses:
Jas. E. Hutchinson
Thos. R. Heath

Inventor:
Austin H. Stewart,
By Bacon Milans
Attys.

No. 867,898. PATENTED OCT. 8, 1907.
A. H. STEWART.
SPACE ELECTROMECHANICAL SYNCHRONIZING MEANS.
APPLICATION FILED JUNE 18, 1903.
8 SHEETS—SHEET 5.
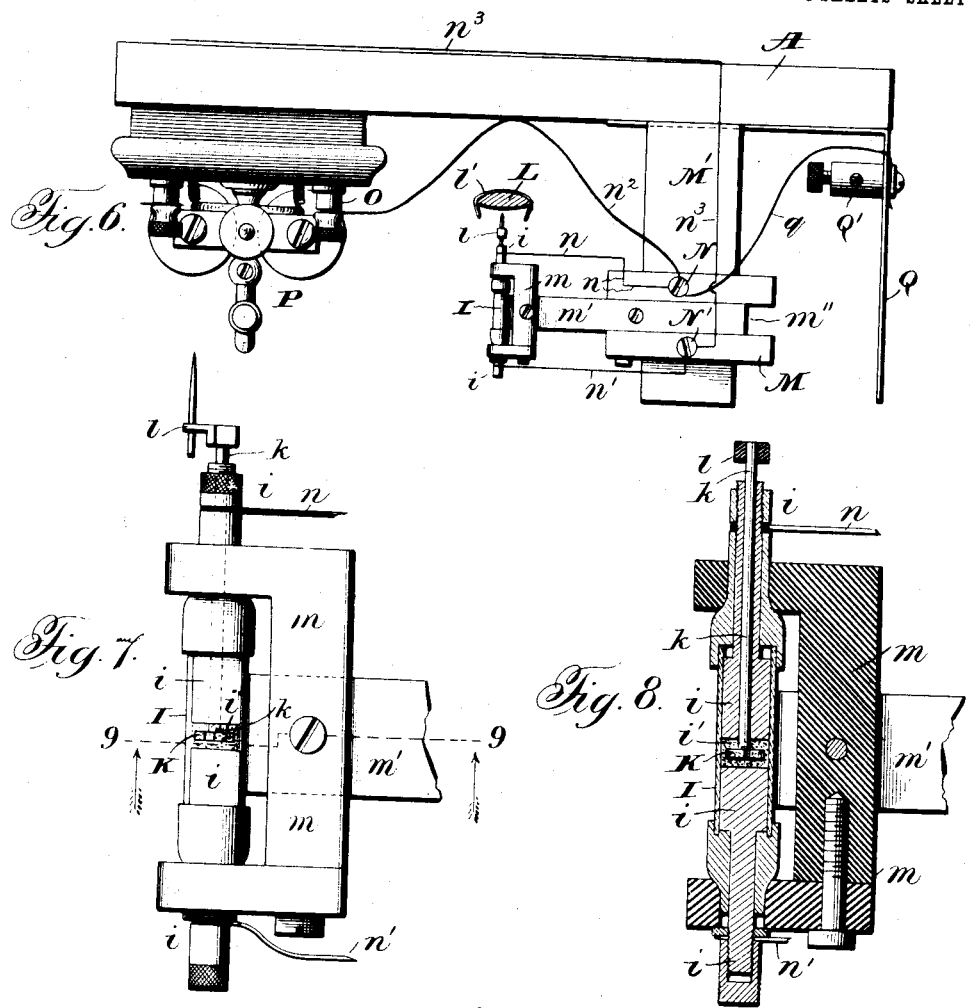
Witnesses:
Jas E Hutchinson
Thos R Heath
Inventor:
Austin H. Stewart,
By Bacon Milans
Attys.

No. 867,898. PATENTED OCT. 8, 1907.
A. H. STEWART.
SPACE ELECTROMECHANICAL SYNCHRONIZING MEANS.
APPLICATION FILED JUNE 18, 1903.
8 SHEETS—SHEET 6.
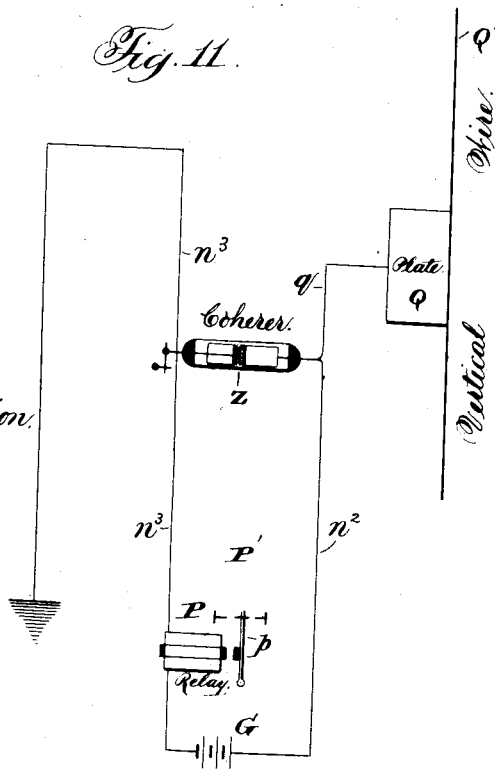
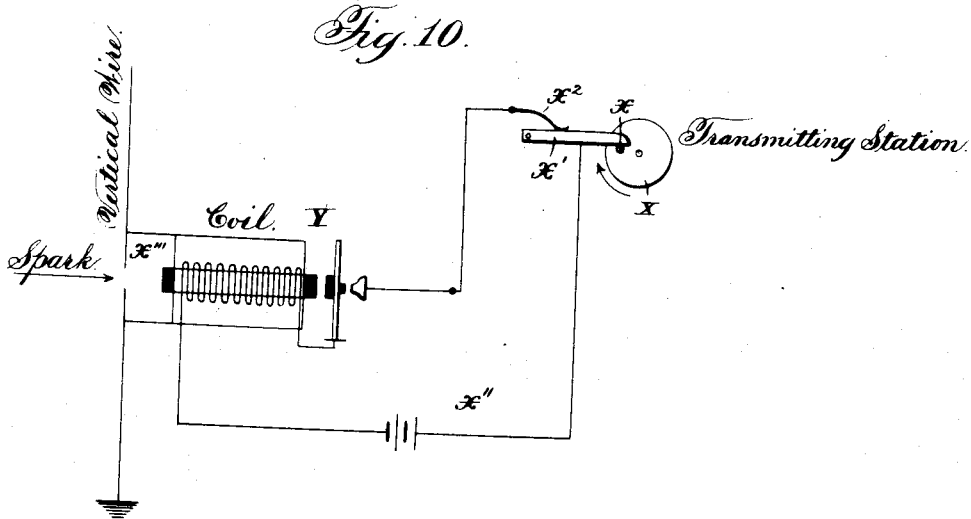

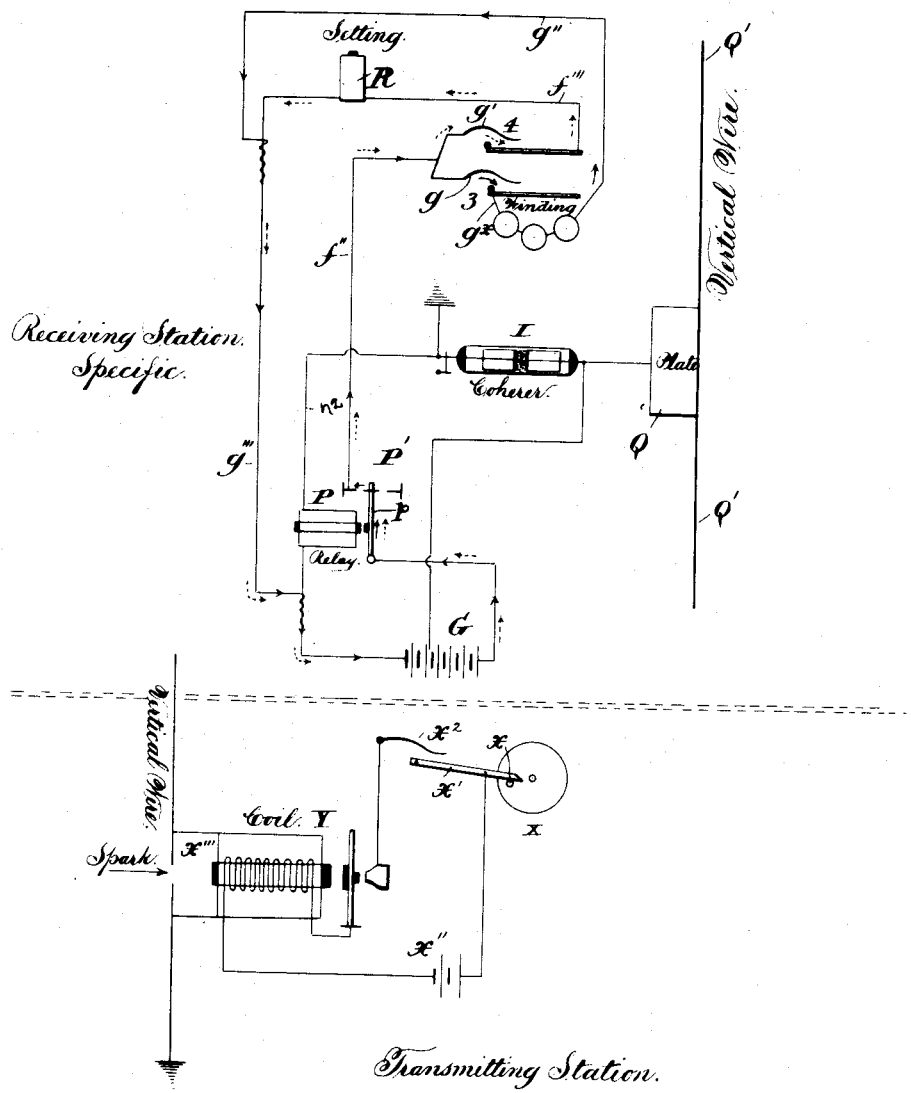

No. 867,898.  
PATENTED OCT. 8, 1907.
A. H. STEWART.
SPACE ELECTROMECHANICAL SYNCHRONIZING MEANS.
APPLICATION FILED JUNE 18, 1903.
8 SHEETS—SHEET 8.
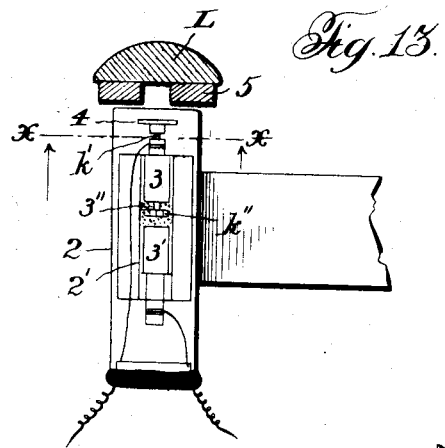
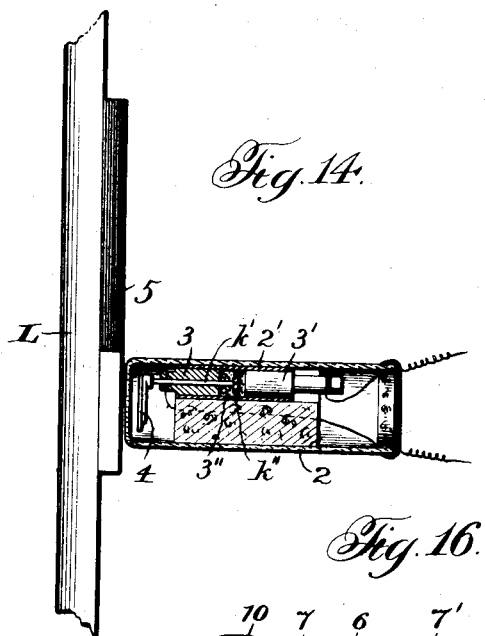
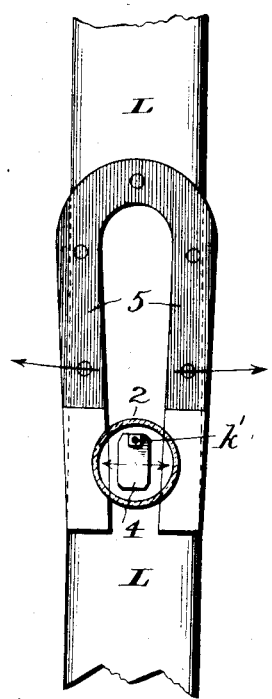
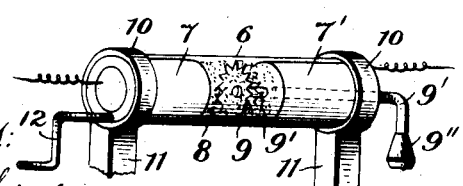
Witnesses:
Jas. E. Hutchinson.
Tho. R. Heath.
Inventor:
Austin H. Stewart,
By Baker & Milans
Attys.

UNITED STATES PATENT OFFICE.

AUSTIN H. STEWART, OF NASHVILLE, TENNESSEE.

SPACE ELECTROMECHANICAL SYNCHRONIZING MEANS.

No. 867,898.  Specification of Letters Patent.  Patented Oct. 8, 1907.

Application filed June 18, 1903. Serial No. 162,113.

*To all whom it may concern:*

Be it known that I, AUSTIN H. STEWART, a citizen of the United States, residing at Nashville, in the county of Davidson and State of Tennessee, have invented certain new and useful Improvements in Space Electromechanical Synchronizing Means, of which the following is a specification, reference being had therein to the accompanying drawing.

This invention relates to space-electro-mechanical means, which, while particularly useful in the synchronizing of time-pieces, is also susceptible of utilization for many other purposes, instances of which are the simultaneous transmission of a given signal or alarm to a plurality of stations, the operation of bells or chimes or the controlling of motors or other mechanism by the actuation of a single controller, as will be apparent from the detailed description hereinafter when read in connection with the accompanying drawings forming part hereof and wherein a preferred embodiment of the invention is illustrated for the purpose of facilitating the impartation of a clear and full understanding of the underlying principles of the invention and the many novel details of structural parts and combinations of elements incident to a perfected construction for carrying the invention into practical effect. It is to be expressly understood, however, that, although certain disclosures of special mechanism are made herein, it is in no sense the intention to be limited to any specific features of construction thereof, but rather that their equivalents may be resorted to, except in-so-far as any such features may be specifically included in the hereto appended claims.

The invention has for an object and comprehends the employment in synchronizing mechanism of space electricity, or what are commonly known as the Hertzian waves or vibrations created by a suitable transmitting medium, conveniently a Ruhmkorff induction coil, for transmitting impulses, so-called, to properly influence or affect a coherer, which is in turn operatively associated with the electrical and mechanical parts necessary in an apparatus of the character under consideration. While the term "Hertzian waves" is used herein, it is because said term is believed to be the broadest manner, at present known, of expressing that element or medium which operates through space from a transmitting station to effect a perceptible result at a receiving station, and this observation is made that the term in question may be appreciated as one of comprehensive rather than restricted application.

In securing practical results by the use of the present invention novel mechanical contrivances have been devised, prominent among which are the constructions of the coherers; the means for agitating and decohering the particles of said coherers; the means for cutting in and out of circuit the winding and hand-setting devices of a clock, and the construction of the hand-setting means, all of which will more fully hereinafter appear.

Figure 2:
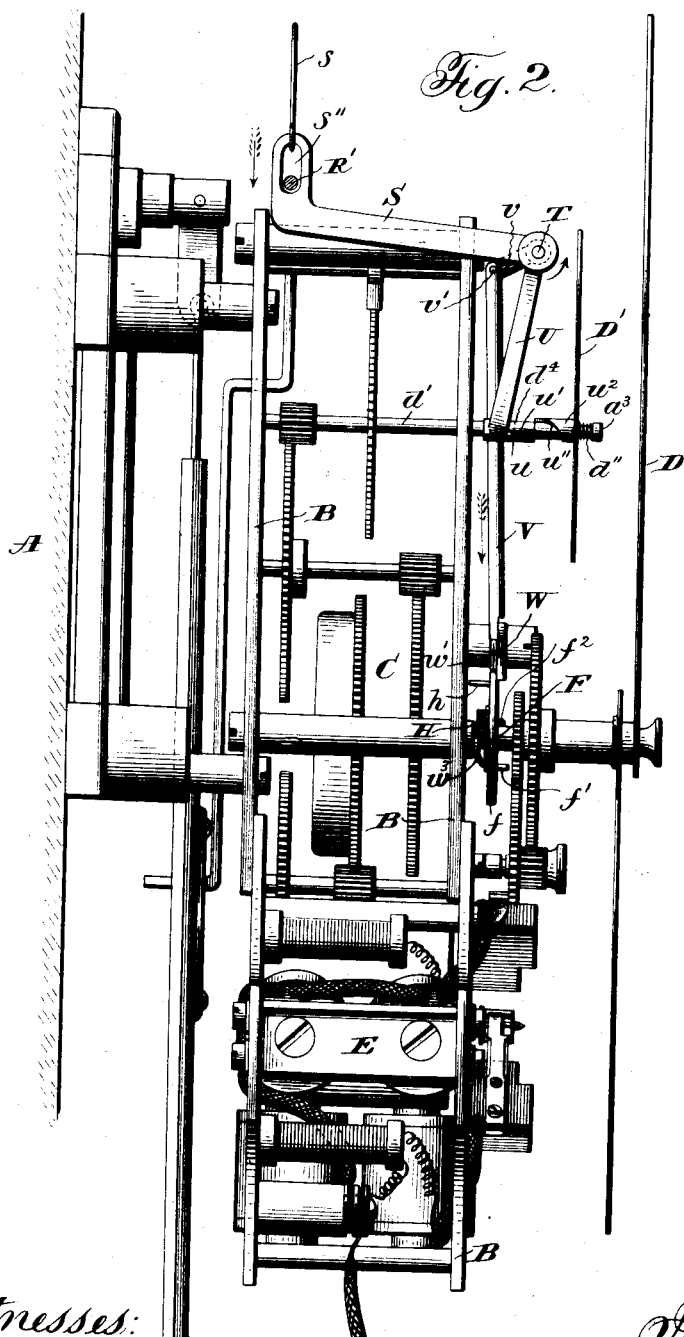
Figure 3:
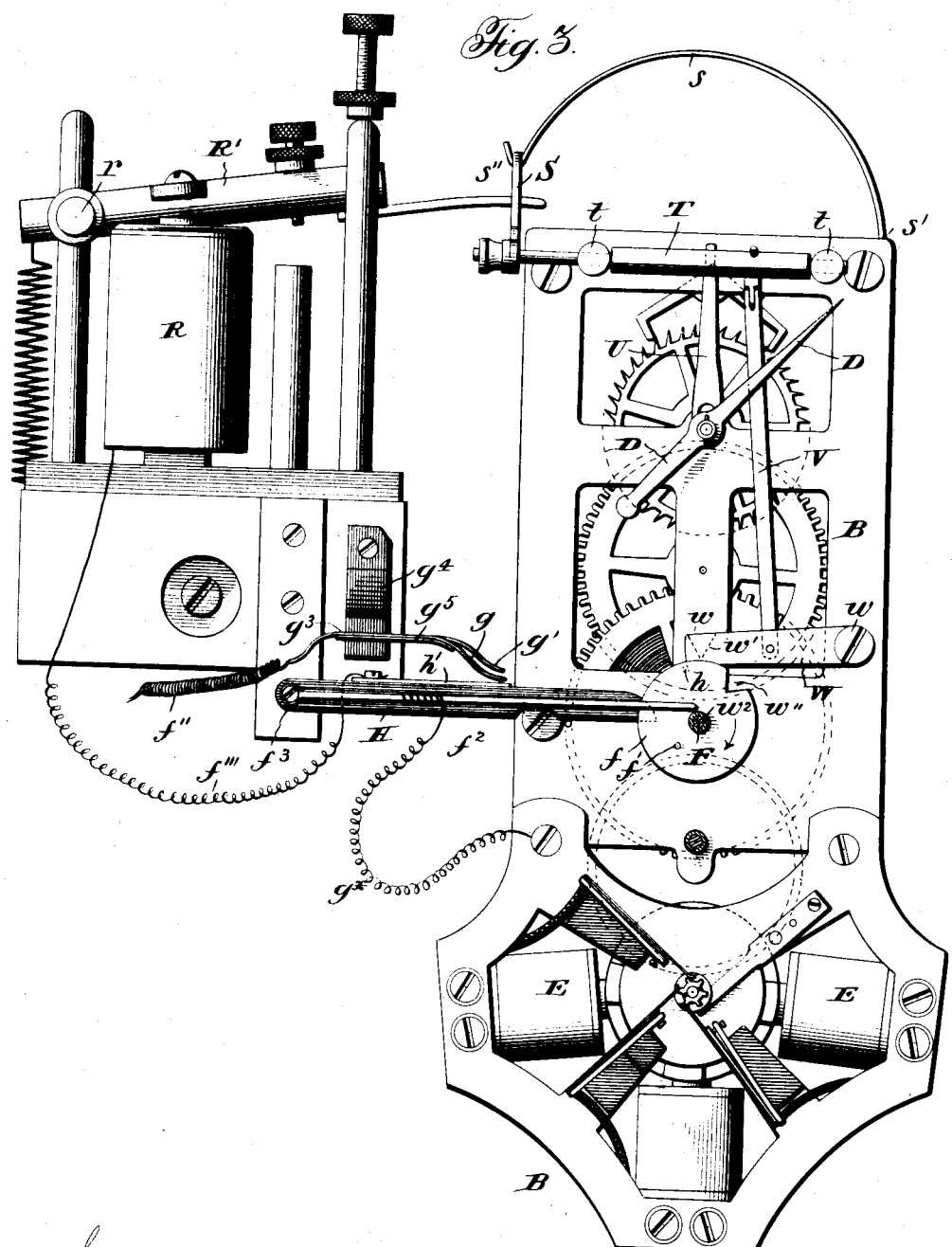
Figure 4:
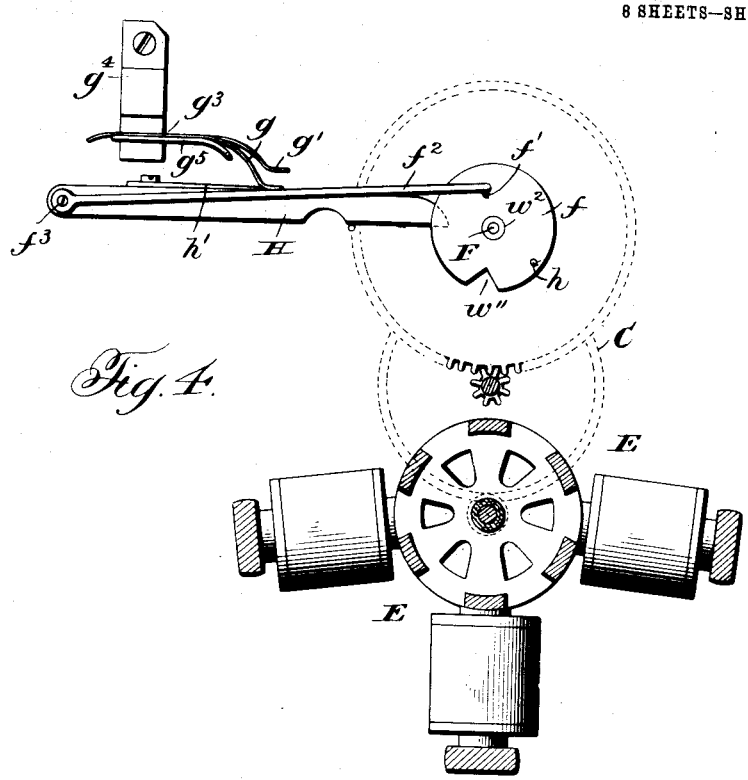
Figure 5:
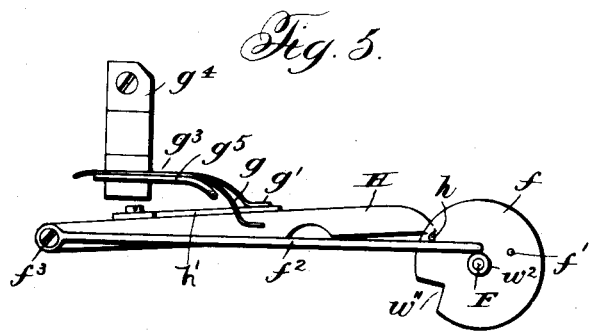

In the drawings, the invention is illustrated as embodied in a clock synchronizing system, the several views of which are as follows:—Figure 1 is a face view of the clock, adapted to be affected by the Hertzian waves, the forepart of the casing and the dial being removed; Fig. 2 is a side elevation of the time-mechanism proper and the immediately related parts; Fig. 3 is an enlarged view of the upper portion of Fig. 1, parts being broken away to bring to sight portions of the interior construction; Fig. 4 is a detail elevation of the circuits controller, and parts of the winding means; Fig. 5 is a similar view of the circuits controller, the parts thereof being shown in a position different from that of the preceding figure; Fig. 6 is a cross-section on the line 6—6, Fig. 1, looking downward in the direction of the arrow; Fig. 7 is a plan view of the coherer and its support shown in the preceding figures; Fig. 8 is a longitudinal horizontal section of said coherer and support; Fig. 9 is a transverse sectional view on the line 9—9 of Fig. 7, looking in the direction of the arrow, to show particularly the star-wheel agitator for decohering the particles of the coherer; Fig. 10 is a diagrammatic view of the wiring at the transmitting station of the system; Fig. 11 is a corresponding view of part of the wiring associated with the clock, or perhaps more properly stated, the receiving station of the system; Fig. 12 is a similar view of the wiring at both the transmitting and receiving stations, that of the receiving station being shown more in detail as compared with Fig. 11; Fig. 13 is a top plan view of a slightly modified form of coherer, a section being taken through the pendulum stem; Fig. 14 is a longitudinal vertical section of the same, a fragment of the pendulum stem being shown in edge elevation; Fig. 15 is a transverse section of Fig. 13 looking in the direction of the arrow; and Fig. 16 is a perspective view of a still further form of the coherer.

Referring more specifically to the drawings, A designates the back-board or plate of the clock to which the operating parts are affixed; B is the frame of the clockworks; C the ordinary clock train; and D D', respectively, the minutes and seconds-hands (Fig. 2).

E indicates in a general way the winding mechanism which it is unnecessary to here define in detail inasmuch as the same is of the character fully disclosed in United States Letters Patent No. 308,521, issued to Chester H. Pond, November 25, 1884, and embraces no part of the present invention save the switch or circuit controller for throwing the same into and out of operation, and this feature will be pointed out herein.

Mounted upon the main operating shaft or arbor which carries the minutes-hands is a circular metallic conducting disk *f*, (Figs. 3, 4 and 5) from the front surface of which a pin $f'$ projects in such a manner that at periodical times during its travel the same will engage the free end of a metallic rod $f^2$ and elevate it upon its pivot $f^3$ until said rod shifts into contact with a spring terminal $g$ of a local circuit designated by full-line arrows (Fig. 12) to be reverted to hereinafter. This circuit will be completed through a wire $f''$ in electrical communication with batteries G, said rod $f^2$, branch wire $g^X$ and the winding mechanism E whereby the winding mechanism will be actuated in the manner set forth in the hereinbefore referred to patent, the return wire running back to the batteries G being represented at $g''$ and $g'''$.

Occupying a plane parallel to that of the rod $f^2$ is an arm H also pivoted at $f^3$ and arranged to project at its free end into the path of circular movement of a pin $h$ projecting outwardly from the rear face of the disk $f$. As the disk rotates the pin $h$ elevates the arm H in a manner similar to the elevation of the rod $f^2$ until the metallic conducting surface $h'$ on the upper edge of said arm comes into contact with the spring terminal $g'$ of the local circuit designated by dotted-line arrows (Fig. 12), when said circuit will be completed through the wires $f''$, $f'''$ and $g'''$ and the hand-setting mechanism.

The spring terminals $g$, $g'$ are electrically connected to one and the same lead ($f''$) they being formed by bifurcating the free end of a leaf spring $g^3$ (Figs. 4 and 5) supported in the slitted end of a fixed cleat $g^4$. The tendency of these terminals is to bend or curl in a downward direction, and to maintain them at the proper elevation a less resilient leaf $g^5$ is supported by the cleat $g^4$ in a way to underlie the terminal and be adjustable longitudinally thereof in an obvious manner.

It will be noticed that the location of the pin $f'$ on the front surface of the disk $f$ is remote relative to the location of the pin $h$ on the rear surface thereof so that the rod $f^2$ and arm H must be alternately actuated rather than simultaneously, which enables the utilization of a single relay for controlling both the winding and setting mechanisms. It is also to be noted that the arm H is composed of bone or other non-conducting or insulated material to overcome any danger of short circuiting between said arm and the rod $f^2$, the latter being formed of metal to serve as a conductor.

In those portions of the description just completed, it has been assumed that the local circuits are normally intact excepting at the point where the terminals $g^3$ and $g'$ abut the rod $f^2$ and arm H, but such is not true, inasmuch as these circuits are also normally open by reason of the non-attraction of the armature $p$ of a magnet P in a relay circuit P' (Figs. 11 and 12), said relay including a coherer which will now be defined, reference being had more particularly to Fig. 1, and Figs. 6, 7, 8 and 9: I designates a tube conveniently of glass, and $i$ are the terminals suitably inserted into and secured at the ends of the tube, while $i'$ represents the metallic granulated or powdered substance intermediate said terminals, such substance ordinarily consisting of proper proportions of nickel and silver filings. While the coherer is under the influence of Hertzian waves this metallic substance coheres as usual, and to decohere the same it has heretofore been suggested to tap, shake or turn over the tube which contains the particles, but as compared with such methods, that designed for the present purposes, i. e.,—means operating on the interior of the tube for agitating and separating the particles, is a decided improvement.

Passing longitudinally through one of the terminals $i$ and rotatable therein is a shaft $k$ carrying at its inner end a star-wheel agitator K, both said shaft and agitator being formed of ivory or other nonconductive material. The star wheel or other agitator, for the same may be different shapes, is arranged within the space between the terminals $i$ together with the metallic powder or substance, and is operated through the medium of a crank $l$ rigidly fastened to the outer end of the shaft $k$ and arranged to be oscillated by the pendulum stem L as the latter vibrates from right to left in the performance of its regular function, an adjustable clip $l'$ embracing said stem and projecting at its ends slightly forwardly therefrom so as to alternately engage and swing the crank $l$ in the direction of movement of the pendulum. To secure the best results the crank $l$ should be initially centered between the ends of the clip $l'$ (Fig. 6) and to this end the coherer is adjustable relative to the pendulum, the adjustment being afforded by a U-shaped bracket $m$ carrying the coherer, the bracket being in turn secured to a bar $m'$ slidable laterally relative to the pendulum in a groove or guideway $m''$ of a block M supported upon a bracket M′ secured to the back-board or plate A.

Secured to the block M are also two binding posts N, N, to the former of which is secured a wire $n$ connecting the same with one of the terminals $i$ of the coherer, and to the latter of which a similar wire $n'$ is secured, the other end of the last mentioned wire being connected to the opposite terminal of the coherer. From these binding posts one wire $n^2$ leads to a post O of the relay magnet P, and thence to the binding post $o$ of the battery series G; and a second wire $n^3$ leads to the second binding post $o'$ of the relay battery series P (Fig. 1), and also through the fourth post $o''$ to ground. A wire $q$ also leads from the post N to a large metallic collecting plate Q (Figs. 1, 6 and 11) which is in turn properly connected with a vertical wire Q′ commonly used in the so-called wireless telegraphic systems, the upper portion of this wire projecting aerially to intercept and receive the action of the waves created at the transmitting station, and conduct the electric impulse down through the large metallic collecting plate and the wire $q$, post N and wire $n$ to the one terminal of the coherer, the opposite terminal thereof leading to the relay batteries in the manner before mentioned.

The hand setting mechanism may now be considered, and in this connection Figs. 2 and 3 will probably be of most assistance.

R is a magnet in the local circuit (dotted arrows Fig. 12) adapted to be energized when the coherer has been duly affected by the spark or other influential excitement caused by the main or master clock, which closes the relay (same figure), the armature of the relay closing said local circuit.

R′ is an armature pivoted at $r$ and arranged to be attracted by the magnet R when the same is energized, but normally held therefrom, while said magnet is de-energized, by a spring-elevated arm S, said spring being of the bowed type indicated by $s$ and secured at $s'$ to the clock-works frame B, the free end of the spring projecting through a slot $s''$ in the arm S, as does also the free end of the armature R′. The outer end of the arm S is rigidly secured to the end of a rock-shaft T mounted in posts $t$ projecting from the front-plate of the frame B. At a point intermediate the ends of the rock-shaft a depending fixed arm U is secured; this arm in turn being pivoted to a loose sleeve $u$ slidable longitudinally of the arbor or shaft $d'$ of the seconds-hand. The forward end of the sleeve $u$ is formed into a cam $u'$ arranged, when in operative engagement to oppose a correspondingly shaped but directly oppositely disposed cam $u''$ formed upon the rear end of a sleeve $u^2$ carried by the seconds-hand. The seconds-hand is normally held sufficiently fast to its shaft $d'$ to be turnable therewith through the medium of a spring $d''$ coiled around the reduced forward end of said shaft, and being backed by a nut $a^3$ exerts a constant pressure against the hand to secure a holding friction between the contiguous ends of the sleeves $u^2$ and a shoulder constituted by enlarging the shaft $d'$ slightly as at $d^4$, it being over this enlarged portion that the sleeve $u$ reciprocates. It will therefore be seen that as soon as the armature R′ is attracted by its magnet its free end contacts the base of the slot in the arm S and forces the arm downwardly (see arrow Fig. 2) against the tension of the spring $s$, (same figure), whereby the lower end of the depending arm U will be thrown forwardly carrying therewith the sleeve $u$, and the cam end of the latter coöperating with the cam end of the sleeve $u'$ will sufficiently overcome the normal friction between the parts to shift the sleeve $u^2$ and hand to a predetermined central or synchronized position. Simultaneously with the deënergizing of the magnet R the parts will be restored to their primary positions by the spring $s$ when the seconds-hand may rotate as usual with its operating shaft.

A rearwardly projecting stub $v$ is also affixed to the rock-shaft T in a manner to move therewith to raise or lower, as the case may be, a rod V pivoted thereto at its upper end, as at $v'$, and at its lower end correspondingly secured to a lever W pivoted at $w$ to the frame B and furnished at its free end with a V-shaped lug $w'$ adapted under certain conditions to coact with the inclined walls bordering a similarly shaped notch $w''$ in the periphery of the disk $f$ for centering or synchronizing the minutes-hands D. The disk is rigidly secured to the inner end of a sleeve $w^2$ (Fig. 3), the opposite end of said sleeve carrying the minutes-hands. This sleeve $w^2$ is mounted upon and normally rotatable with the shaft or arbor F, adequate friction between the parts for that purpose being created by the spring spider $w^3$ arranged to exert its force against the disk $f$ (Fig. 2). When, however, the lug $w$ engages the inclined walls of the notch $w'$ in the disk, incident to the downward thrust of the rod V and lever W when the rock-shaft T and its stub $v$ is actuated by the retraction of the armature R′ by its magnet R, the tension of the spring spider $w^2$ will be temporarily overcome to permit the disk together with its sleeve $w^2$ and the minutes-hands to rotate independently of the operating gear train to bring said minutes-hands also to a predetermined central or synchronized position. The lug $w'$ will be retracted from the notch $w'$ in an obvious manner immediately upon the deënergizing of the magnet R.

The operation of the system may perhaps be more readily followed by reference to the diagrammatic views, and firstly to the transmitting station, as illustrated in Fig. 10;—X designates a controller which may be a rotatable disk operatively connected with the time-works of a master or main clock to which all other clocks of the series to be synchronized are subordinate. This disk carries a pin $x$ arranged to engage the free end of a pivoted switch $x'$ to close the primary circuit $x''$, one terminal of which connects with said switch while its opposite terminal connects with a leaf spring contact $x^2$.

Y is a Ruhmkorff induction coil, the secondary circuit $x'''$ of which, when the primary circuit is closed by the master clock, generates a spark of predetermined codal character in harmony with the receptive means for the waves or impulses radiating from said spark.

In Fig. 11 which shows the circuit in general at the receiving station, Q′ is the vertical wire; Q the metallic collecting plate; Z the coherer; P′ the relay circuit, P the relay magnet, and G the relay batteries. It will be noted that the wire $q$ runs from the collecting plate Q to one terminal of the coherer, while the wire $n^3$ runs from the other terminal to ground, and also that each coherer terminal connects with one terminal of the relay circuit P′, so that when waves of the proper codal character are intercepted by the vertical wire, collecting plate Q and wire $q$ and transmitted to the coherer the desired influence is imparted to the coherer to complete the relay circuit, whereupon the armature $p$ of the consequently energized relay magnet P will be attracted to facilitate the operation of the mechanism requisite for the accomplishment of the ends desired herein, illustrated more in detail in Fig. 12, in which both the transmitting and receiving stations are illustrated, the former being the same as shown in Fig. 11 with some of the parts occupying a somewhat different relation owing to the changed position of the controller disk and its pin. The armature of the relay having been attracted as suggested in connection with Fig. 11, we will suppose that the disk $f$ has rotated to an extent sufficient to establish electrical communication at the point 3. This will complete a circuit through the relay batteries, wires $f''$, $g''$ and $g'''$, as shown by full line arrows, which will include the winding means of the clock, whereupon said winding means will operate in the manner set forth in the Pond patent hereinbefore disclaimed. If, on the other hand, we assume that the disk $f$ is in its alternate position establishing electrical communication at the point 4, then the closed circuit will follow the course of the dotted arrows and energize the magnet R to actuate the hand setting mechanism.

The controller disk X may be designed to operate at any desired times, that herein being described adapted to make and break contact at the transmitting station every half hour, and its rapidity of rotation is preferably twice that of the disk $f$ at the receiving station, whereby the hand setting mechanism and the winding mechanism will be alternately operated every hour, the time of operation of the former being on the hour, and that of the latter on the half hour.

In Figs. 13, 14 and 15, the coherer shown comprises a sealed glass shell 2, constituting a casing, an inner glass tube 2′, and the terminals 3 and 3′ fitted to and projecting into said tube, the metallic powder 3″ being interposed therebetween. The agitator comprises the shaft $k'$ and star-wheel $k''$, the means for operating the same being somewhat different from that before described. Suspended from the outer end of the shaft k' is a depending metallic plate 4 which is so related to a magnet 5 carried by the pendulum stem L that as said stem oscillates, the plate being constantly attracted thereby will follow the back and forth movement of the magnet, thereby imparting the desired movement to the star-wheel.

Another form of the coherer is that illustrated in Fig. 16, the characteristic feature of which resides in the fact that the tube is rotatable relative to the agitator rather than vice versa as in the preceding embodiments. In this figure, 6 is the glass tube, 7, 7' the terminals therein, 8 the metallic powder, 9 the star-wheel agitator and 9' the operating shaft thereof. The tube is loosely mounted in rings 10, secured to the supporting standards 11, and projecting outwardly from one end of said tube is a crank 12 arranged to project between the ends of the clip l' carried by the pendulum stem L, in the same manner that the crank l projects between said ends of the clips in Fig. 6. The result of this present construction is that as the pendulum vibrates, the crank will rotate the tube 6 in the rings 10, and to effect the agitation of the metallic particles which of course shift slightly with the tube, the star-wheel is held practically stationary by a depending weight 9" at the outer end of its shaft 9', the constant tendency of said weight being to maintain its center of gravity.

I desire it understood that my invention embraces the utilization of metallic cases, frames or faces of clocks, alone or otherwise, as receivers, and that they may be formed or arranged to constitute a plurality of such receivers.

For the want of better terms, I employ in the claims such expressions as "operable through space" and "transmitted through space", meaning thereby to denote the absence, partially or wholly, of tangible conductors, such as wires, etc.; also "codal disturbances" meaning thereby a wave and any other variance from a normal or natural condition, created in accordance with a predetermined plan to be in harmony with the instrumentalities at the receiving stations or subordinate clocks, whereby the system will be inoperable by stray waves, etc.

The coherers herein described will not be claimed because they more properly constitute the subject-matter for a divisional application.

Having thus described the invention what is claimed as new and desired to be secured by Letters Patent is:—

1. In combination with a time piece, synchronizing mechanism including a coherer operatively connected therewith, a transmitter for creating a wave operable through space upon said coherer for the purpose described, and decohering instrumentalities arranged to be actuated by a moving part of the mechanism.

2. In combination with a time piece, synchronizing mechanism including a coherer operatively connected therewith, means operable through space upon the coherer for the purpose described, and decohering instrumentalities arranged to be actuated by a moving part of the mechanism.

3. In combination with a time piece, synchronizing mechanism including a coherer operatively connected therewith, a transmitter adapted to create a codal disturbance operable through space upon the coherer for the purpose described, and decohering instrumentalities arranged to be actuated by a moving part of the mechanism.

4. In combination with an indicator, and means for normally operating the same, a motor for reënergizing the operating means, means for setting said indicator, means for controlling said motor and setting means including a coherer operatively connected therewith, a transmitter adapted to create a wave operable through space upon said coherer for the purpose described, and decohering instrumentalities arranged to be actuated by a moving part of the mechanism.

5. In combination with a time piece, means for setting the hands and winding the operating means thereof, and means for controlling said setting and winding mechanism including a coherer operatively connected therewith, a transmitter adapted to create a wave operable through space upon said coherer for the purpose described, and decohering instrumentalities arranged to be actuated by a moving part of the mechanism.

6. In combination with an indicator, and means for normally operating the same, a motor for reënergizing the operating means, means for setting said indicator, and means for controlling said motor and setting means including a coherer operatively connected therewith, a transmitter adapted to create a codal disturbance operable through space upon said coherer for the purpose described, and decohering instrumentalities arranged to be actuated by a moving part of the mechanism.

7. In combination with a time piece, means for setting the hands and winding the operating means thereof, and means for controlling said setting and winding means including a coherer operatively connected therewith, a transmitter adapted to create a codal disturbance operable through space upon said coherer for the purpose described, and decohering instrumentalities arranged to be actuated by a moving part of the mechanism.

8. In combination with a time piece, winding means, means for controlling the operation thereof including a coherer operatively connected therewith, a transmitter adapted to create a wave operable through space upon said coherer for the purpose described, and decohering instrumentalities arranged to be actuated by a moving part of the mechanism.

9. In combination with a motor, means for controlling the operation thereof including a coherer operatively connected therewith, and a transmitter adapted to create a codal disturbance operable through space upon said coherer for the purpose described, and decohering instrumentalities arranged to be actuated by a moving part of the mechanism.

10. In combination with a time piece, winding means, means for controlling the operation thereof including a coherer operatively connected therewith, a transmitter adapted to create a codal disturbance operable through space upon said coherer for the purpose described, and decohering instrumentalities arranged to be actuated by a moving part of the mechanism.

11. In a clock, hand setting means, winding means, electrical means for operating said setting and winding means, means for throwing said electrical means into and out of operation including a moving part on the clock mechanism, two controlling devices constituting switches operatively related thereto, an electric circuit terminal for each switch, and means whereby said terminals may be adjusted relative to said controlling devices.

12. In a clock, hand setting means, winding means, electrical means for operating said setting and winding means, means for throwing said electrical means into and out of operation including a moving part on the clock mechanism, two controlling devices constituting switches operatively related thereto, adapted to be alternately actuated, an electric circuit terminal for each switch, and means whereby said terminals may be adjusted relative to said controlling devices.

13. In a clock, hand setting means, winding means, electrical means for operating said setting and winding means, and means for throwing said electrical means into and out of operation including a moving part on the clock mechanism, two pivoted controlling devices constituting switches, operatively related thereto, a lead in the electric circuit, and branch terminals on said lead one for each switch.

14. In a clock, hand setting means, winding means, electrical means for operating said setting and winding means, means for throwing said electrical means into and out of operation including a moving part on the clock mechanism, two controlling devices constituting switches operatively related thereto, an electric circuit spring terminal for each switch, and means whereby said spring terminals may be adjusted relative to said controlling devices.

15. In a clock, hand setting means, winding means, electrical means for operating said setting and winding means, means for throwing said electrical means into and out of operation including a moving part on the clock mechanism, two controlling devices constituting switches operatively related thereto, adapted to be alternately actuated, an electric circuit spring terminal for each switch, and means whereby said spring terminals may be adjusted relative to said controlling devices.

16. In a clock, hand setting means, winding means, electrical means for operating said setting and winding means, means for throwing said electrical means into and out of operation including a moving part on the clock mechanism, two controlling devices constituting switches operatively related thereto, a lead in the electric circuit, branch spring terminals on said lead one for each switch, and adjustable means for limiting the bending of said spring terminals toward the controlling devices.

17. In a clock, hand setting means, winding means, electrical means for operating said setting and winding means, and means for throwing said elecerical means into and out of operation including a moving part on the clock mechanism, two controlling devices constituting switches operatively related thereto, adapted to be alternately actuated, a lead in the electric circuit, branch spring terminals on said lead one for each switch, and adjustable means for limiting the bending of said spring terminals toward the controlling devices.

18. In a clock, hand setting means, winding means, electrical means for operating said setting and winding means, means for throwing said electrical means into and out of operation including a moving part on the clock mechanism, two controlling devices constituting switches operatively related thereto, an electric circuit spring terminal for each switch, means whereby said spring terminals may be adjusted relative to said controlling devices, and adjustable means for limiting the bending of said spring terminals toward the controlling devices.

19. In a clock, hand setting means, winding means, electrical means for operating said setting and winding means, means for throwing said electrical means into and out of operation including a moving part on the clock mechanism, two controlling devices constituting switches operatively related therewith, adapted to be alternately actuated, an electric circuit spring terminal for each switch, means whereby said spring terminals may be adjusted relative to said controlling devices, and adjustable means for limiting the bending of said spring terminals toward the controlling devices.

20. In a clock, means for regulating a part of the clock mechanism, and electric means for controlling the operation of said means, including a moving part on the clock mechanism, a switch operatively related thereto, a lead in the electric circuit, a terminal on said lead for said switch, and means whereby said terminal may be adjusted relative to said switch.

21. In a clock, means for regulating a part of the clock mechanism, and electric means for controlling the operation of said means including a moving part in the clock mechanism, a switch operatively related thereto, a lead in the electric circuit, a spring terminal on said lead for said switch, and means whereby said spring terminal may be adjusted relative to said switch.

22. In a clock, means for regulating a part of the clock mechanism, and electric means for controlling the operation of said means including a moving part in the clock mechanism, a switch operatively related thereto, a lead in the electric circuit, a spring terminal on said lead for said switch, means whereby said spring terminal may be adjusted relative to said switch, and means for limiting the bending of said spring terminal toward the switch.

23. In a clock, means for regulating a part of the clock mechanism, and electric means for controlling the operation of said means including a moving part in the clock mechanism, a switch operatively related thereto, a lead in the electric circuit, a spring terminal on said lead for said switch, means whereby said spring terminal may be adjusted relative to said switch, and adjustable means for limiting the bending of said spring terminal toward the switch.

24. In combination with a clock, electrically controlled means for setting the minutes and seconds hands, said means including a disk having a substantially V-shaped notch in its periphery, a correspondingly-shaped engaging member adapted to engage and center said disk, a pivoted lever carrying said engaging member, an operating rod loosely connected to said member, and a rock-shaft having a stub with which said rod is operatively connected.

25. In combination, clock mechanism, including a motor and means for controlling the operation of the motor of said mechanism and for setting a hand of the clock including a coherer susceptible to the influence of a codal disturbance operable through space.

26. In combination, clock mechanism, a motor for re-energizing the motor of said mechanism, means susceptible to the influence of a codal disturbance transmitted through space for controlling said first mentioned motor, and a transmitter adapted to create such disturbance.

27. In combination, clock mechanism, a motor for re-energizing the motor of said mechanism, and means susceptible to the influence of a codal disturbance transmitted through space for controlling said first-mentioned motor.

In testimony whereof I affix my signature in presence of two witnesses.

AUSTIN H. STEWART.

Witnesses:
FRANK SLEMONS,
EDWD. E. BARTHELL.